(12) United States Patent
Guerrero et al.

(10) Patent No.: US 9,329,872 B2
(45) Date of Patent: May 3, 2016

(54) METHOD AND APPARATUS FOR THE DEFINITION AND GENERATION OF CONFIGURABLE, HIGH PERFORMANCE LOW-POWER EMBEDDED MICROPROCESSOR CORES

(71) Applicant: Esencia Technologies Inc., San Jose, CA (US)

(72) Inventors: Miguel A. Guerrero, San Jose, CA (US); Alpesh B. Oza, San Jose, CA (US)

(73) Assignee: ESENCIA TECHNOLOGIES INC., San Jose, CA (US)

( * ) Notice: Subject to any disclaimer, the term of this patent is extended or adjusted under 35 U.S.C. 154(b) by 300 days.

(21) Appl. No.: 13/872,414

(22) Filed: Apr. 29, 2013

(65) Prior Publication Data

US 2013/0290692 A1    Oct. 31, 2013

Related U.S. Application Data

(60) Provisional application No. 61/639,282, filed on Apr. 27, 2012.

(51) Int. Cl.
*G06F 9/44*      (2006.01)
*G06F 15/78*     (2006.01)

(52) U.S. Cl.
CPC .......... *G06F 9/4403* (2013.01); *G06F 15/7867* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 6,477,697 B1 * | 11/2002 | Killian et al. ................. | 716/103 |
| 7,640,553 B2 * | 12/2009 | Zimmer et al. ............... | 719/321 |
| 7,840,777 B2 * | 11/2010 | Mykland ........................ | 712/15 |
| 8,665,996 B2 * | 3/2014 | Zanotelli et al. .............. | 375/340 |
| 8,738,860 B1 * | 5/2014 | Griffin et al. ................. | 711/122 |

* cited by examiner

*Primary Examiner* — Chun Cao
*Assistant Examiner* — Mohammad A Rahman

(57) ABSTRACT

A system and method for configuring a microprocessor core may allow a microprocessor core to be configurable. Configuration may be dynamic or automatic using an application program. Microprocessor memory, decoding units, arithmetic logic units, register banks, storage, register bypass units, and a user interface may be configured. The configuration may also be used to optimize an instruction set to run on the microprocessor core.

15 Claims, 5 Drawing Sheets

METHOD AND APPARATUS FOR THE DEFINITION AND GENERATION OF CONFIGURABLE, HIGH PERFORMANCE LOW-POWER EMBEDDED MICROPROCESSOR CORES

CROSS-REFERENCE TO RELATED APPLICATIONS

This Application claims the benefit of Provisional Application No. 61/639,282, filed Apr. 27, 2012. The current application is filed on Apr. 29, 2013 while Apr. 27, 2013 was on a weekend.

BACKGROUND OF THE INVENTION

Microprocessor cores are components of microprocessor units that may read and execute program instructions to perform specific tasks. Configurability may add value to the microprocessor core by allowing a user to choose the best performance/area trade-offs that meet the requirements of the typical applications to run. Current microprocessor cores may not allow the user to obtain an optimal tradeoff between performance and area.

As can be seen, there is a need for a system and method to configure microprocessor cores.

SUMMARY

In one aspect of the invention, a system for configuring a microprocessor, comprises a microprocessor core; a configurable memory unit on the microprocessor core; a plurality of configurable decoder units on the microprocessor core; a plurality of configurable arithmetic logic units on the microprocessor core; a configurable bank of registers on the microprocessor core; a plurality of configurable storage units on the microprocessor core; a configurable register bypass unit on the microprocessor core; and a configurable user interface attached to the microprocessor core, wherein the configurable memory unit, plurality of configurable decoder units, plurality of configurable arithmetic logic units, configurable bank of registers, configurable storage units, configurable register bypass unit, and configurable user interface are dynamically configurable, and wherein the following are dynamically configurable: presence or absence of an interrupt controller on the microprocessor core; whether the microprocessor core has a big-endian or little-endian configuration; width of a data path in the microprocessor core; whether a plurality of restricted predication instructions are included in a slot of the microprocessor core; whether the microprocessor core has a top down and application driven configuration; whether binary translation post processing into an instruction set architecture from a different processor instruction set architecture is performed; whether a compiler automatically detects a combination of instructions; whether a human-written template description written in hardware description language may be utilized for description of the microprocessor core; whether user defined extension instructions are provided in different languages as different views of the extension instructions, and are provided as an interface to other instructions; whether instruction encoding for the slot in the microprocessor core includes a set of supported instructions and a number of registers supported for the slot; and whether data is statistically spread across multiple banks of memory in the microprocessor core.

In another aspect of the invention, a system for configuring a microprocessor, comprises a microprocessor core; a configurable memory unit on the microprocessor core; a plurality of configurable decoder units on the microprocessor core; a plurality of configurable arithmetic logic units on the microprocessor core; a configurable bank of registers on the microprocessor core; a plurality of configurable storage units on the microprocessor core; a configurable register bypass unit on the microprocessor core; and a configurable user interface attached to the microprocessor core, and wherein the configurable memory unit, plurality of configurable decoder units, plurality of configurable arithmetic logic units, configurable bank of registers, configurable storage units, configurable register bypass unit, and configurable user interface are dynamically configurable.

In a further aspect of the invention, a method for configuring software for a microprocessor core, comprises receiving a configuration for the microprocessor core; combining the configuration for the microprocessor core with an instruction set; feeding the configured instruction set into a simulator; analyzing the performance of the instruction set on the microprocessor core using the simulator; adding and deleting instructions to the instruction set based on performance of the instructions on the microprocessor core that is implemented by the simulator; customizing a vector in a slot of the microprocessor core, including number of items per vector, and vector bit width; and customizing the instruction set based on a future predicted need for the instruction set on the microprocessor core.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention which may be referred to as "EScala", generally provides a framework for the configuration and generation of an embedded processor. The present invention may allow increased configurability of microprocessor cores over current methods.

Configuration may be performed at very fine-grained level of detail. In addition, configuration may be either application driven or user driven or a combination of both. The typical flow may involve running several instances of an application or multiple applications that are targeted for the microprocessor core. The EScala framework may allow the gathering of execution traces and performance statistics which may drive the generation of configuration parameters, while leaving a few high-level control parameters to the user.

Figure 1:
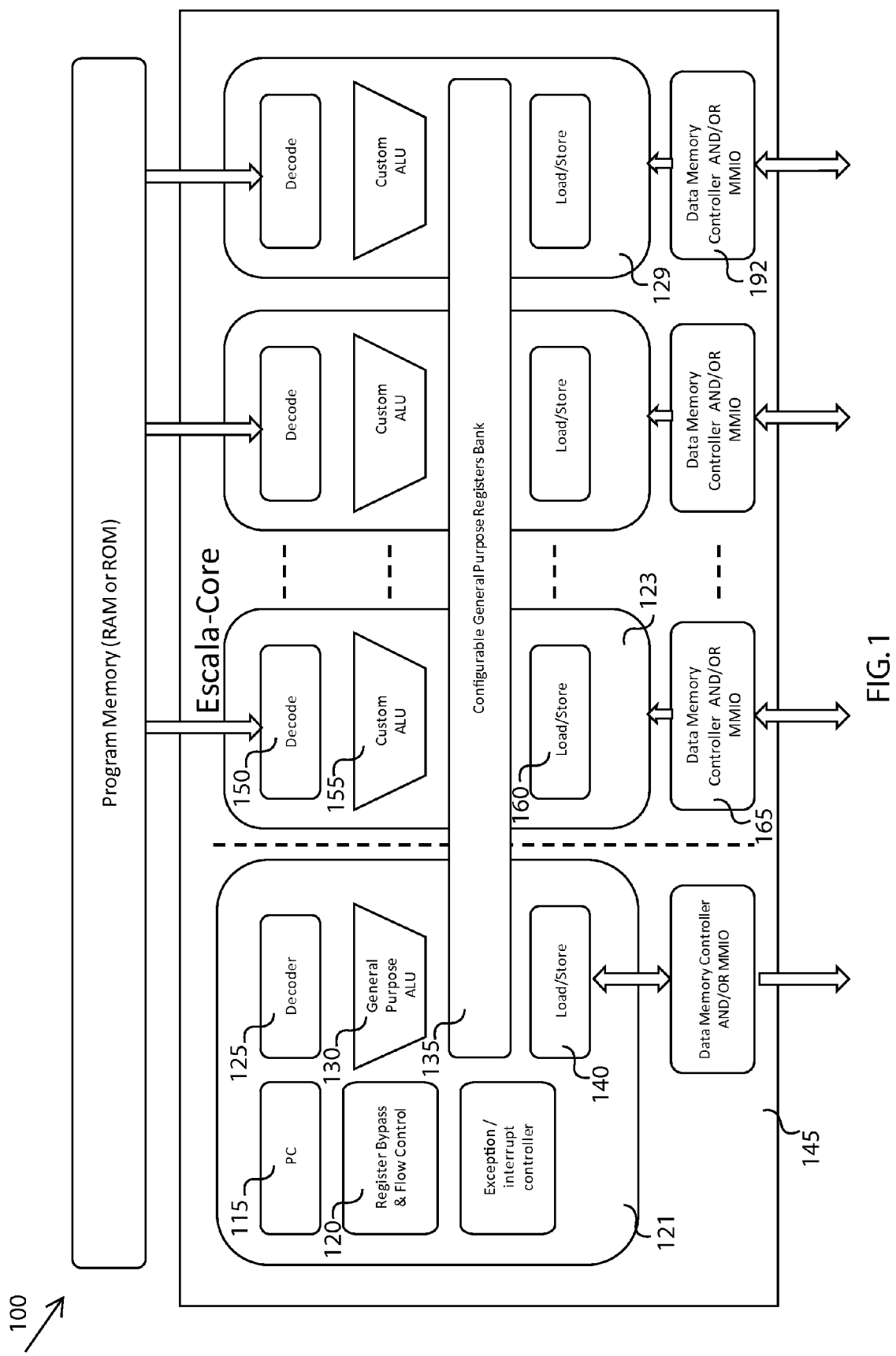
FIG. 1 illustrates a block diagram showing configurable hardware in an exemplary embodiment of the present invention.

Referring to FIG. 1, a block diagram of the present invention 100 showing configurable hardware is shown. Program memory 110 instruction fetching may be driven by a program counter (PC) 115 and may share data with a decoder 125.

A Bus Multiplexer (BUSMUX) and register bypass with flow control 120 may feature register-bypass/forwarding across slots. EScala generated processor instances may be fully pipelined and may feature register-bypass/forwarding across slots. This feature may allow an instruction in a cycle n to use the results produced in a cycle n−1 even though those results are not yet written back into the register file. An instruction in cycle n may need to consume data from an instruction in cycle n−1 and may be forced to be in a different slot due to slot specialization. The register bypass across slots may avoid unnecessary delays in the processing chain. The number of registers in a register file/set may be configurable and may be virtually limitless. Solutions may range from very few registers to hundreds of them to avoid excessive memory accesses during performance intensive loops.

EScala cores are statically scheduled microprocessors, such that the compiler decides at compilation time which slots execute which instructions, with a plurality of slots, the number of slots being fully configurable. Each slot may comprise an independent data-path including its own instruction decoding and execution units (e.g., Arithmetic Logic Units or ALU's) independent of the other slots. One of the slots may be specialized for jump instructions and thus only one (common) copy of the program counter may be kept for the whole processor. EScala may include Harvard architecture processors, where instruction and data space are separate. This may allow for increased execution throughput on cache-less systems.

The program memory 110 also may share data with a decoder associated with a plurality of "Ways/Slots" (configurations of a microprocessor core), from Slot 1 123 to Slot N. Each slot, such as slot 1 123, may comprise, in addition to a decoder 150, a custom arithmetic logic unit (ALU) 155 and a load/store unit 160. EScala may include a configurable number of load/store units ranging from 1 to the number of slots instantiated on a given configuration/instantiation of a microprocessor core. Local memory to the microprocessor may be banked in such a way that the number of banks is decoupled from the number of load/store units. An application may use a number of banks at least equal or greater than the number of load/store units to get a performance advantage.

A data memory controller 145 may output the data to a bus or, for example, a computer monitor. A configurable general purpose register(s) bank 135 may communicate with both the PC 115 and all ways from slot 1 123 through slot N 129. The mapping of data into banks may be performed in several ways. Under detailed user control, in which the user may specify which program 'section' a data-structure belongs to by inserting appropriate 'pragma' or compiler directive information in the source code or alternatively in a plurality of separate control files. Subsequent steps during program linking may map those sections into specific memory banks according the user inputs. Alternatively data may be statistically spread, either automatically or by a user, across multiple banks of memory (e.g., every bit word may be assigned to a bank in sequentially increasing order, wrapping around to the bank once the highest bank is reached). This may be effective when the user has little knowledge on which data structures are used simultaneously during the program.

Each slot from slot 1 123 through slot N 129 may interact with a configurable memory-mapped input/output (MMIO) unit 165,192. Slot 0 121 may include a general purpose arithmetic logic unit 130, and may interact with a data memory controller 145 through a load/store unit 140. EScala may support high bandwidth (BW) paths to other peripheral or to other EScala instantiations. These paths may be separate from load/store paths to memory. Communication through these channels may follow a simple first-in first-out (FIFO) like interface and allows the program being executed to be automatically flow-controlled (data-flow architecture) if the requested data is not available or the produced data has not been consumed by a downstream device. This may allow EScala to generate processor instances to follow a simple programming model where there is no need for the controlling software to check levels of data available/consumed. This may allow the efficient implementation of multi-core microprocessor subsystems with sophisticated high-performance inter core connectivity patterns.

EScala may allow a microprocessor core to be configured either dynamically by a user or by an application program. Examples of configurable items in the microprocessor core may be memory, decoder units, arithmetic logic units, register banks, storage units, register bypass units, number of timers, and user interfaces. The storage units may have load and/or store capabilities.

EScala may be configured in other features as well:

Presence or absence of exception/interrupt controller where individual exceptions can be configured to be supported or not Presence or absence of instruction and/or data caches along with their sizes and associativity characteristics (direct mapped, multi-way) and for data-caches whether is write-through or write-back;

Presence or absence of one or more floating point arithmetic acceleration units on a per slot basis with granularity on types of operations and precision supported by the hardware (reduced precision, single precision, double precision or user defined)

Presence or absence of one or more vector processing units on a per slot basis with defining parameters such as number of items per vector, vector element bit width, vector operations supported and vector memory bus width configurable separately on a per instance/slot basis The number of vector registers supported in the vector register file.

The presence or absence of hardware support for unaligned data memory accesses.

Whether all the registers are accessible to all slots or they are 'clustered', for example, different subsets of registers accessible by different subsets of slots (with or without overlap).

Whether restricted predication instructions are to be included or not (on a per slot basis).

Whether vector memory (for processors featuring a vector unit) is shared with non-vector data or not.

Whether an instruction compression unit should be included or not.

Whether the processor core behaves as big-endian or little-endian.

The number of pipeline stages (among a limited set of options).

Whether the data path should be reduced from the nominal 32*b* to 16*b* or expanded to 64*b* for area reductions of performance increases respectively The configuration choices described above provide the user with the capability of trading off area/performance/power as it best fits the application(s) at hand providing a wide range of EScala options.

Additionally a set of EScala generated files intended for software consumption (software development kit or SDK) for a given configuration may include a set of C++ classes or C API to handle vectors in a unified fashion so that depending on the HW implementation it takes advantage of extra vector processing unit operations or processes data without hardware vector processing unit support. Similarly it contains configuration/option information to inform the compiler on whether some specific operations need to be emulated or have native hardware support. This may allow EScala configuration exploration graphical user interface (GUI) to generate configurations with a wide range of performance area power trade-offs without requiring the user to modify its source code in most cases.

A EScala hardware description may be generated from a hand-written template-based description. This approach may be more reliable and efficient than full dynamic code generation. The template description may be personalized with EScala generated parameter files to produce a complete and self contained hardware description language (HDL) description of the microprocessor. Microprocessor core generation may be based on a semi-automated configuration (including tool driven configuration and user provided inputs) of a parametric, human-written templates of HDL code for the hardware description of the microprocessor core.

Figure 2:
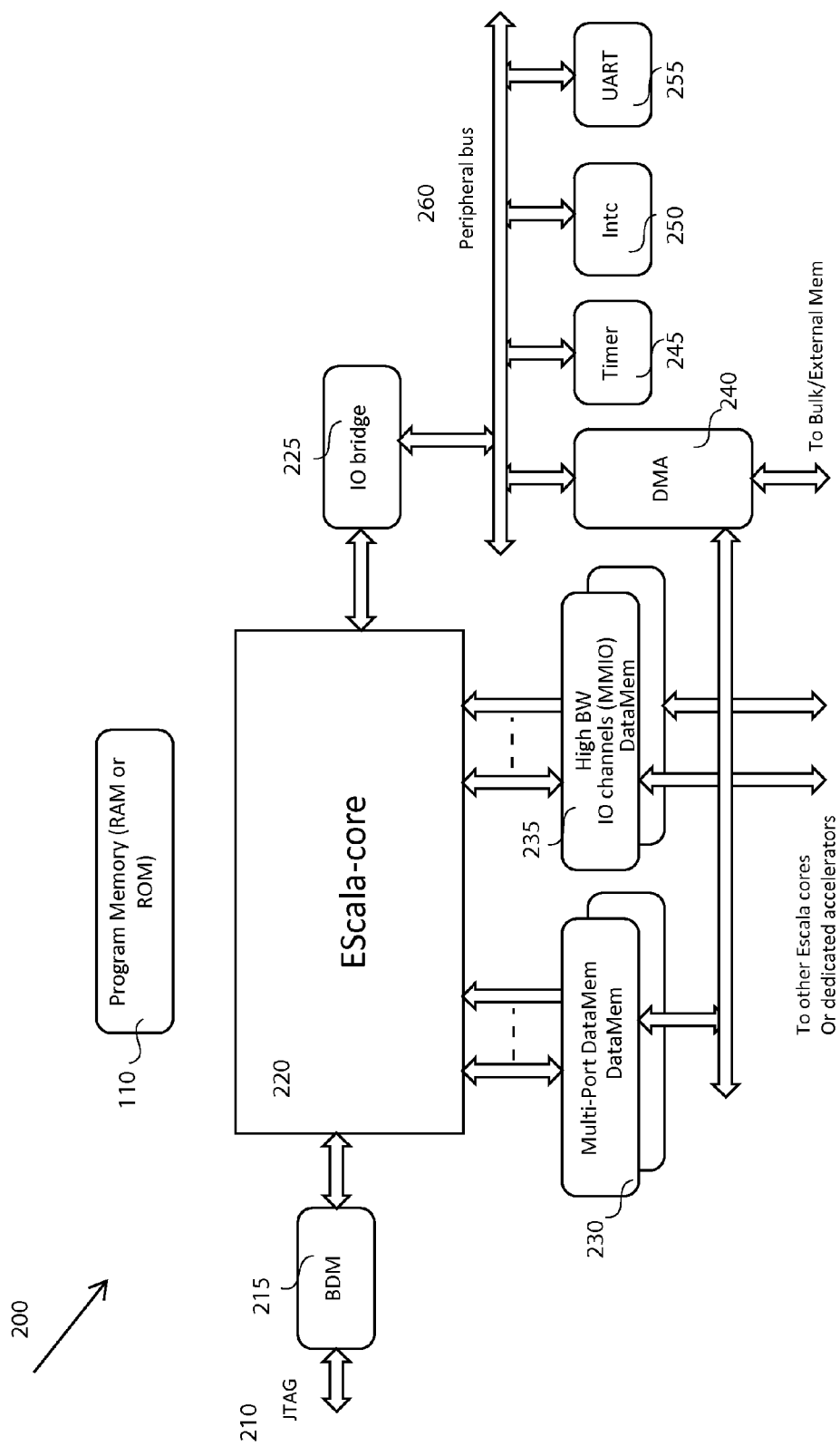
FIG. 2 illustrates a block diagram of the configurable hardware of FIG. 1 showing interfacing with a bus.

FIG. 2 illustrates a block diagram 200 of the configurable hardware of FIG. 1 showing interfacing with a bus 260. An EScala configurable microprocessor core 220 is shown interfacing with memory 110, BDM (background debug module) connected with JTAG (joint test action group architecture), an IO bridge 225, high bandwidth IO channels 235, and multiport data memory 230. The peripheral bus 260 is shown connected with direct memory access (DMA) 240, a timer 245, interrupt controller (Intc) 250, and a universal asynchronous receiver/transmitter (UART) 255.

Figure 3:
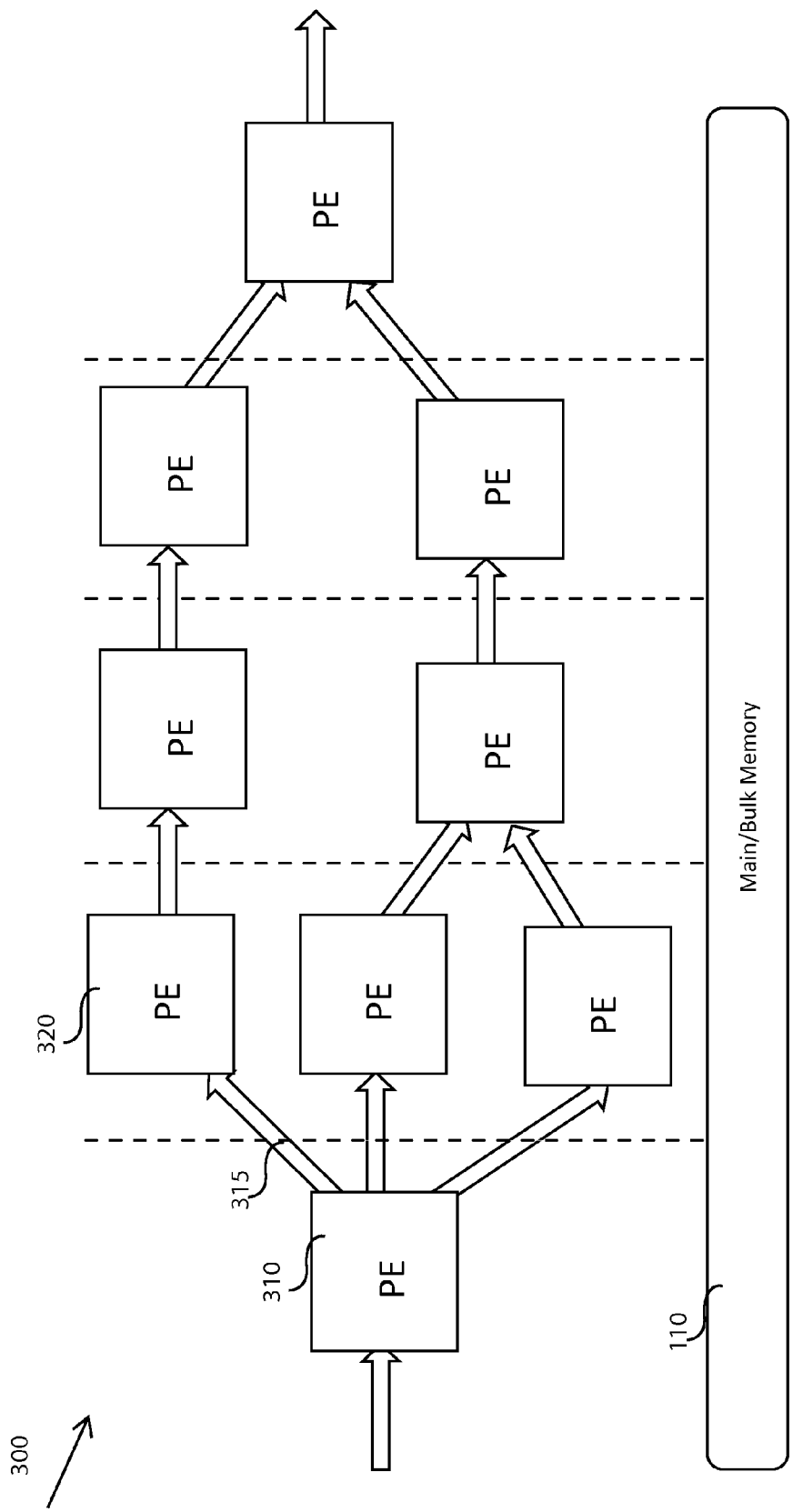
FIG. 3 illustrates a high-level view of a multi-core subsystem of FIG. 1.

FIG. 3 illustrates a high-level view 300 of a multi-core subsystem of FIG. 1. Shown are multiple microprocessor cores 310, 320, with an interface 315 between the microprocessor cores. All microprocessor cores (PE) may access main bulk memory 110. Creation of multi-processor systems can exploit task level parallelism.

Figure 4:
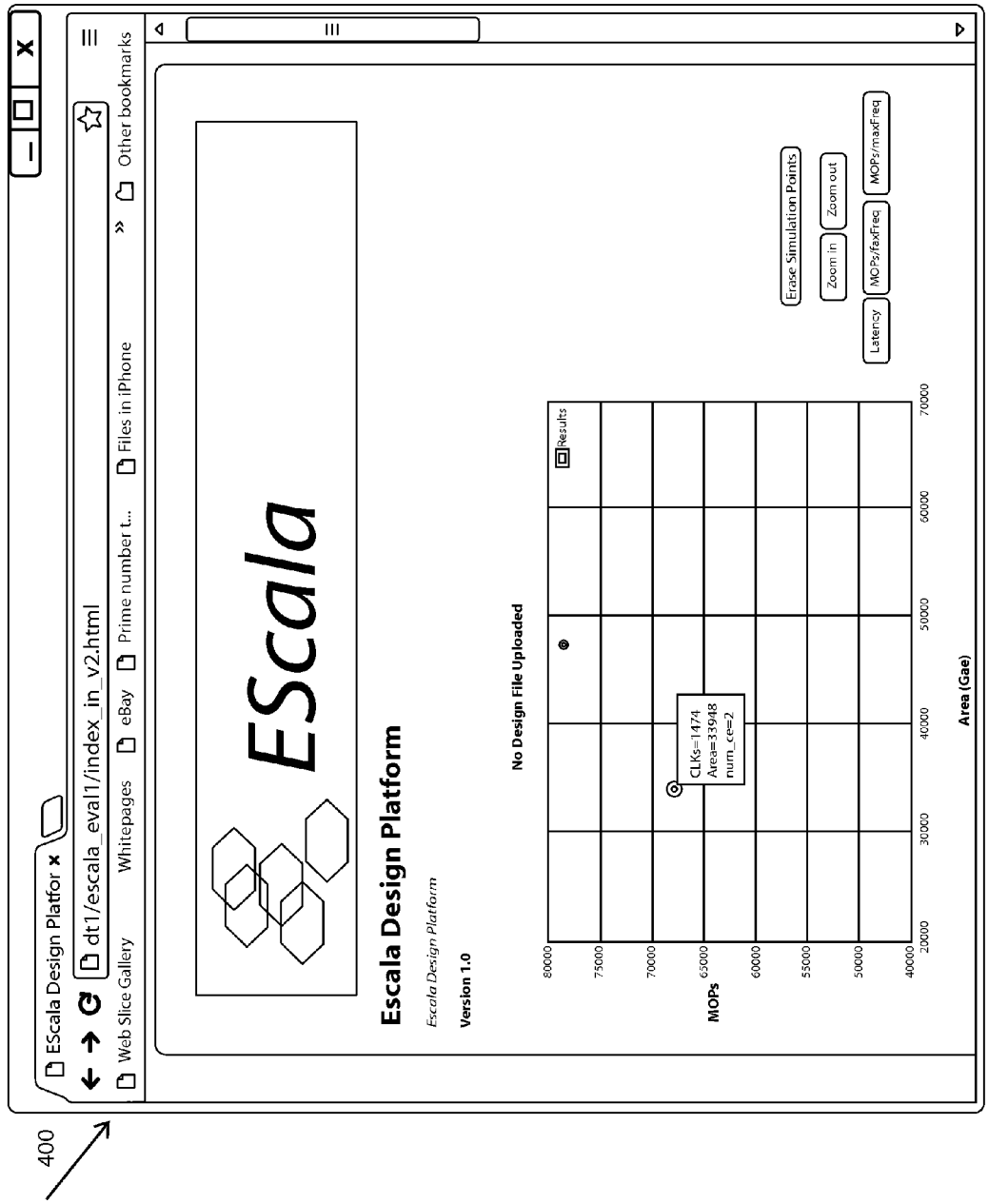
FIG. 4 illustrates a screen view of a user interface for the configurable hardware of FIG. 1.

FIG. 4 illustrates a screen view 400 of a user interface for the configurable hardware of FIG. 1. In an exemplary embodiment, a user interface design may be chosen based on an array of automatically generated options. A web interface may run applications on a cloud. A customer may dedicate virtual machines on the web to configure microprocessor cores. A user interface may also be installed on a fixed local computer for microprocessor core design.

Figure 5:
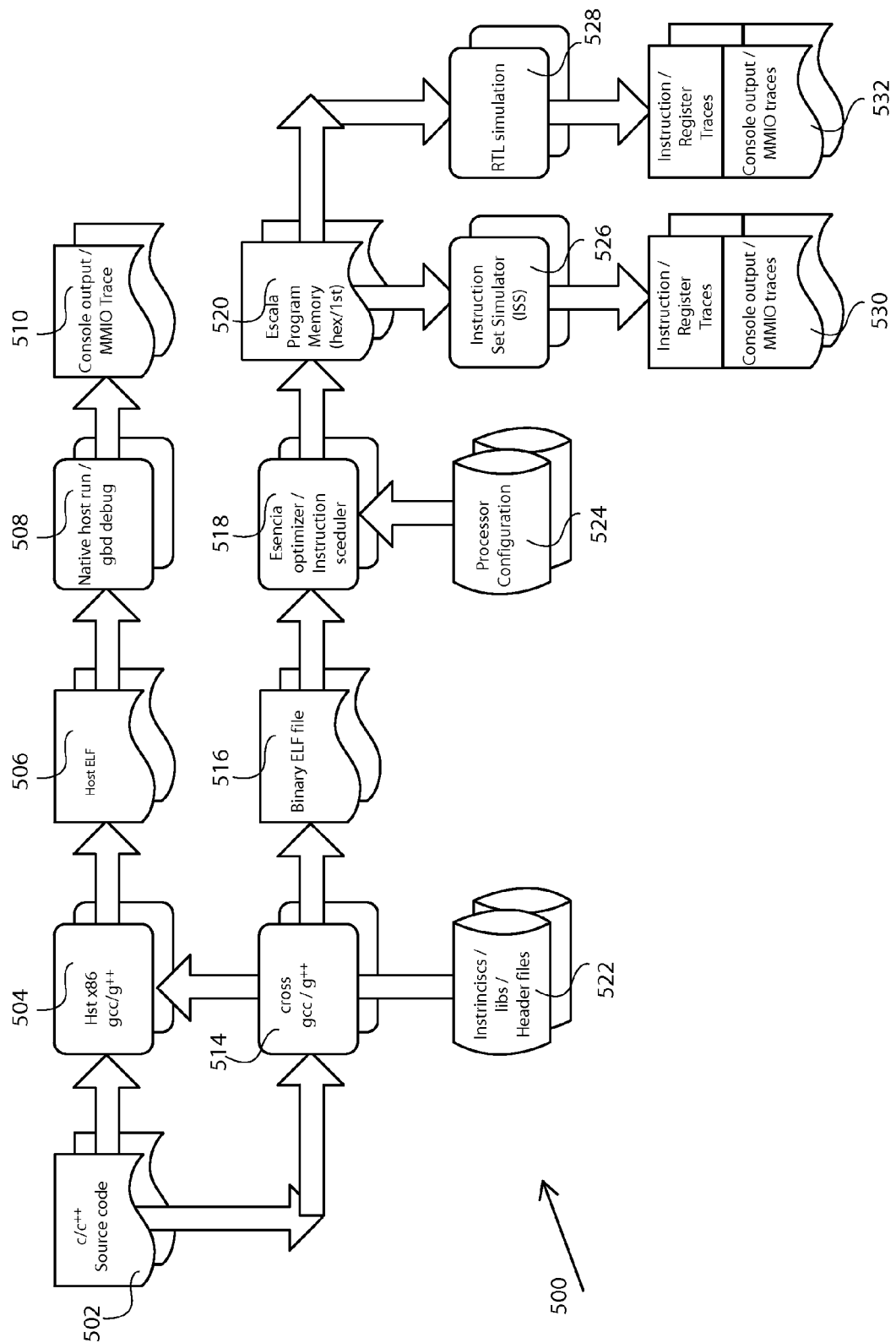
FIG. 5 illustrates a flow chart of software configuration in another exemplary embodiment of the invention.

Referring to FIG. 5, a flowchart of configuration of software according to an embodiment of the invention 500 is shown. Source code 502 such as C/C++ may be fed into a cross compiler 554, into an Executable and Linkeable Format (ELF) host file 506, through a native host run/gdb debugger 508, and out to a console 510, with a user interface that may show MMIO traces. For example, a configuration for a microprocessor may be received, and may be combined with an instruction set. This instruction set may then be fed into a simulator to analyze performance of the instruction set on the simulator. Instructions may then be added or deleted from the instruction set based on performance of the instructions on the microprocessor using the simulator. Performance of each of the instructions in the instruction set may be output in the form of a graph on a user interface. The instruction set may be customized based on current performance of the instruction set. The instruction set may also be customized based on a future predicted need for the microprocessor. In addition, the instruction set may be customized based on individual slot properties for each slot on the microprocessor.

Configuration of software 500 may also be performed using a preprocessor, before feeding code into a EScala cross-compiler 514 such as gcc/g++. Header files /libraries/Instrinsics may be fed into the cross compiler 514. A binary ELF file 516 may result. EScala software flow also allow the cross-compiler to be a non-native EScala cross-compiler by performing binary translation post processing into EScala instruction set architecture (ISA) from a different processor instruction set architecture.

An optimizer/instruction scheduler 518 such as EScala compiler may be fed a processor configuration 524, and the instruction scheduler 518 may be used to feed instructions into program memory 520, after which a register transfer level (RTL) simulation may be performed. Instruction/register traces and console output/MMIO traces may be output to a console 532 for comparison with the traces generated by instruction set simulations and native host simulations.

Instructions may also be fed to an instruction set simulator (ISS) 526, from which instruction/register traces and console/output MMIO traces 530 may be output to a console. Configuration files may be frozen when RTL files for hardware generation are integrated into a silicon design. The customized program along with the configuration files may be fed to the instruction set simulator 526 to make sure that functionality matches what is expected (captured by traces on native host simulations), to evaluate cycle count/performance and to ensure that the RTL files generated are also functioning and performing correctly.

A base Instruction Set Architecture (ISA) may be reduced if specific portions of the ISA are not used under automated analysis of the application. This may be performed at a very low level of granularity from fixed function devices where the functionality or program to be executed by the microprocessor core is fixed, or may be done leaving a minimum sufficient instruction set to ensure any new program may still be executed (where reduced ISA only affects performance but not final functionality).

The base ISA may be expanded in various ways: The user may provide a set of "user defined extension instructions". These user defined extension instructions may become part of the microprocessor core by providing a standard interface to any number of such a user defined extension instructions. The presence of the extension instructions may be controlled on a per-slot basis. The presence of the extension instructions may increase a number of input/output operands by "ganging" or combining slots in the microprocessor core. The user may provide several views of the extension instruction (functional c/c++ for simulation, RTL for generation) which may be automatically checked for equivalence. This approach provides full flexibility to the user. Alternatively the descriptions may be derived from a common representation (for example but not limited to the RTL version of it, where the simulation view is automatically generated from it with standard simulation flows). Additionally, EScala framework may automatically detect new instructions that may benefit an overall cost function (typically a function including program performance and overall area/power cost) by combining several instructions that repeat in sequence in performance of critical portions of the program. The application statistics taken by EScala may allow the toolset to decide which instructions are more interesting to be generated. This 'combo' instruction derivation may be automatically performed by a compiler and may be performance-driven but may also be area driven (to economize in register utilization) under user control.

Extension instructions may be instantiated in the program or discovered by the EScala frame work in the following ways: Instantiation may happen in the way of 'instrinsics' or function calls that directly represent low level extension instructions. Additionally, an EScala framework tool chain may automatically discover graph patterns that match these instructions in the low level representations of the program. Furthermore, C++ operator overloading may be used to map into the extension instructions during program compilation.

Extension instructions may be combined to allow for extra input/output parameters. For example, an extension instruction may be defined as occupying two slots. This allows the extension instruction hardware to write to two destination registers and source two times the amount of input operands (or alternatively the same number of input operands two times as wide) without any extra added complexity to the rest of the microprocessor Hardware. The number of slots need not be limited to two, in general an extension instruction utilizing N slots will be able to source 2×N operands and generate N outputs, or sourcing 2 operands N times as wide as the original ones and produce one result N times as wide as the originals or combinations in between.

The instruction encoding may be parameterized and configured automatically to be the most efficient fit for the final ISA selected (base ISA with possible reductions+possible extensions). The instruction encoding may also be customized per slot to allow for efficient slot specialization. For example if a slot performs only loads or no-operations (NOPs), a single bit may be sufficient to encode its op-code. Instruction encoding may include setting the number of supported instructions for a slot on the microprocessor core, and the number of registers supported or accessible for the slot.

EScala instructions may have more than two source operands for specific instructions by adding additional ports to the entirety or part of the register file.

The source code 502 may be generated by the user in a text editor or by other means and may be debugged with the debugger 508 in a host environment with convenient operating system support. Once the application behaves as desired on a host platform, its input/output traces may be captured in files and declared acceptable for subsequent steps. The same source code 502 may have now pragmas intended for EScala flow that may be processed by the preprocessor 512. Information on the source/pragmas may be gathered or and the code at source level may be transformed before being fed into the cross compiler 514 for a given microprocessor.

The cross compiler 514 may be optionally customized for the EScala framework to facilitate additional steps. The binary output may then be processed by the EScala framework postprocessor/optimizer software to generate the final program for a given microprocessor configuration. During initial phases of this process, the configuration files may be automatically generated by the optimizer software and may be made available to the user for further customization (e.g. to add extra resources that may provide headroom for application growth). This auto-generation of configuration files may be performance/area/power driven based on application run statistics and automated analysis of user provided application instances.

Post-processing may allow the user to choose from a variety of compiler vendors and versions as long as the produced ISA is compatible with EScala's software flow inputs. EScala may utilize an OpenRISC input base ISA but the invention is not limited to OpenRISC as an input.

By providing a high level of fine-grained configurability, EScala may enable fast time to market for the development of complex blocks. The high level of configurability may allow selecting sufficient resources to achieve the right performance and at the same time removing from the solution the resources that are not required. This may allow efficient (in terms of area and power) implementation of complex blocks in short time spans.

Fine-grained configurability may be intrinsically more complex than coarse grained configurability. EScala flow may address this issue by allowing automated configuration of many of the relevant parameters, leaving to the user the option to configure parameters as well. EScala may require the user to provide a lower number of input parameters to drive the configuration to the desired performance/power/area design point. The EScala automated configuration flow may be based on an automated analysis of an application or applications of interest and performance statistics/traces taken over runs on a plurality of data sets.

Additionally, a post-processing approach for the software flow may have the following benefits:

Simplified management of tool-chain versioning, by keeping most of the configuration aware passes of the compiler on the post-processing stages of the compiler.

Protection of investment as the process is independent of the tool-chain used.

Software simplicity, as it is not required to start with the port of a full tool-chain to provide a custom microprocessor configuration to an application and related application transformations to fit that microprocessor.

Fast turn-around cycles, as new tool-chains need not be generated for each EScala configuration as the later/postprocessing portion of the compiler can read at run-time configuration details of the EScala instance being handled.

The invention may be top down and application driven.

The present invention therefore provides for automating the customization of a highly configurable microprocessor. Further, the present invention allows for high performing programmable solutions and simple software tool-chain management.

It should be understood, of course, that the foregoing relates to exemplary embodiments of the invention and that modifications may be made without departing from the spirit and scope of the invention as set forth in the following claims.

What is claimed is:

1. A system for configuring a microprocessor, comprising:
a microprocessor core;
a configurable memory unit on the microprocessor core;
a plurality of configurable decoder units on the microprocessor core;
a plurality of configurable arithmetic logic units on the microprocessor core;
a configurable bank of registers on the microprocessor core;
a plurality of configurable storage units on the microprocessor core;
a configurable register bypass unit on the microprocessor core; and
a configurable user interface attached to the microprocessor core,
wherein the configurable memory unit, plurality of configurable decoder units, plurality of configurable arithmetic logic units, configurable bank of registers, configurable storage units, configurable register bypass unit, and configurable user interface are dynamically configurable; and
wherein the following are dynamically configurable:
presence or absence of an interrupt controller on the microprocessor core;
whether the microprocessor core has a big-endian or little-endian configuration;
width of a data path in the microprocessor core;

whether a plurality of restricted predication instructions are included in a slot of the microprocessor core;

whether the microprocessor core has a top down and application driven configuration;

whether binary translation post processing into an instruction set architecture from a different processor instruction set architecture is performed;

whether a compiler automatically detects a combination of instructions;

whether a human-written template description written in hardware description language may be utilized for description of the microprocessor core;

whether user defined extension instructions are provided in different languages as different views of the extension instructions, and are provided as an interface to other instructions;

whether instruction encoding for the slot in the microprocessor core includes a set of supported instructions and a number of registers supported for the slot; and whether data is statistically spread across multiple banks of memory in the microprocessor core.

2. The system of claim 1, wherein presence or absence of instruction caches and data caches on the microprocessor core is dynamically configurable.

3. The system of claim 1, wherein presence or absence of a floating point arithmetic acceleration unit on the microprocessor core is dynamically configurable on a per slot basis with respect to a slot on the microprocessor core.

4. The system of claim 1, wherein the number of pipeline stages on the microprocessor core is dynamically configurable.

5. The system of claim 1, wherein the number of data paths on the microprocessor core is dynamically configurable.

6. The system of claim 1, wherein the number of timers on the microprocessor core is dynamically configurable and wherein a plurality of subsets of the registers are accessible by a plurality of subsets of a plurality of slots in the microprocessor core.

7. The system of claim 1, wherein a configuration of the system is top down or application driven, wherein a combination of user provided constraints and profile derived information from one or more user provided applications is used to produce different configurations with different performance/area/power trade-offs in a semi-automated fashion.

8. The system of claim 1, wherein a compiler for the configurable microprocessor core is structured as a standard cross-compiler, mostly but not limited to being configuration unaware, followed by a post-processing compiler which is configuration aware, that maps, schedules and optimizes code for a particular chosen configuration, wherein the post-processing compiler is not limited to take as input code an instruction set architecture of the system, and wherein the post-processing compiler also performs binary translation from a different instruction set architecture to the system instruction set architecture.

9. The system of claim 1, wherein a compiler included in the system has the capability to automatically detect a combination of instructions previously generated at configuration time, by analyzing an instruction/operator/operand graph of a program and comparing them to a plurality of graphs of each of the combination of instructions without user modification to source code of the system.

10. The system of claim 1, wherein user defined extension instructions increase a number of input/output operands by combination of several instruction slots without affecting processor core design and without increasing a number or width of values to extract from the configurable bank of registers.

11. The system of claim 1, wherein instruction encoding is customized: for each of plurality of slots in the microprocessor core; as a function of supported instructions on each of the plurality of slots, and as a number of registers supported/accessible by each of the plurality of slots.

12. The system of claim 1, wherein user data is spread among different memory data banks statistically.

13. The system of claim 1, wherein user data is spread among different memory data banks by pragmas inserted in system source code by the user.

14. The system of claim 1, wherein the user can extend the instruction set architecture by defining user defined extension instructions in a standard language such as hardware description language by providing different views for simulation or logic synthesis with no other constraint other than adhering to the interface for user defined extension instructions defined by the microprocessor core.

15. The system of claim 1, wherein the user can extend the instruction set architecture by defining user defined extension instructions in a standard language such as hardware description language by providing one master view, such as the hardware description language view, and deriving the others automatically.

\* \* \* \* \*